United States Patent [19]

Clinkenbeard et al.

[11] Patent Number: 4,870,613

[45] Date of Patent: Sep. 26, 1989

[54] METHOD FOR INTERACTIVELY CHANGING VIDEO DISKS

[75] Inventors: William L. Clinkenbeard, Ft. Mitchell; James G. Lea, Florence, both of Ky.

[73] Assignee: Cincinnati Milacron Inc., Cincinnati, Ohio

[21] Appl. No.: 142,753

[22] Filed: Jan. 11, 1988

[51] Int. Cl.⁴ ............ G06F 11/32; G06F 13/10; G06F 15/40; G11B 17/22
[52] U.S. Cl. .................... 364/900; 369/30; 369/69
[58] Field of Search ... 364/200 MS File, 900 MS File; 369/30, 178, 195, 199, 24, 69 MS File

[56] References Cited

U.S. PATENT DOCUMENTS 4,333,152 6/1982 Best ..................................... 364/521
4,360,345 11/1982 Hon ..................................... 434/262
4,422,105 12/1983 Rodesch et al. .................... 364/410
4,425,586 1/1984 Miller ................................. 360/33.1
4,766,581 8/1988 Korn et al. ......................... 364/900

OTHER PUBLICATIONS

David Hon, "Interactive Training in Cardiopulmonary Resuscitation", BYTE, Jun. 1982, pp. 108-138.
Stan Jarvis, "Videodiscs and Computers", BYTE, Jul. 1984, pp. 187-203, esp. pp. 196-198.

Primary Examiner—Emanuel S. Kemeny
Assistant Examiner—Christopher H. Lynt
Attorney, Agent, or Firm—C. Richard Eby

[57] ABSTRACT

The identity of a desired video disk is compared to the identity of a video disk in use in a video disk player. If the desired video disk is not the same as the video disk in the player, instructions are given to change the video disk, and a comparison is again made.

5 Claims, 3 Drawing Sheets

4,870,613

METHOD FOR INTERACTIVELY CHANGING VIDEO DISKS

BACKGROUND OF THE INVENTION

Over the last several years computers have been interfaced with video disk players and touch screen monitors to provide a more interactive system than was previously available with only keyboard I/O and computer generated graphics. The combination of a video disk player, computer generated graphics, and a touch screen monitor all interfaced with a computer has given rise to more versatile interactive systems.

For example, utilizing the above combination, training systems are now available which are self-paced to the student and may be easily personalized to the student's requirements. The utilization of video displays from a video disk provides access to a wide range of high resolution color displays of materials. Those displays in combination with a touch screen monitor allows a student/user to quickly move through a training program with a minimum of keyboard entry activity.

More sophisticated or larger training systems may require several video disks or video disk sides, and it is important that the proper disk or disk side be loaded in the video disk player. With some training systems, the course activity may be a sequential activity from start to finish. In those cases, the disk sides are used in a simple sequential fashion, e.g. side 1, then side 2, then side 3, etc. However, more sophisticated training systems may allow the user to move to different nonsequential programs, and therefore video disks or video disk sides may be selected and used randomly.

The present invention addresses the problem of how video disk or disk side changes are to occur. For purposes of this specification, the terms video disk and video disk side are considered interchangeable. Prior systems provided the user some message that one side was finished and that another side should be loaded. Other systems have supplementary printed instructions which call for a particular disk side in association with a particular training session.

In contrast to the bare instructions provided by known systems, the disclosed invention provides an interactive system to assist the user in selecting the proper disk side at the proper time and thereafter having the user verify that the proper disk side selection has been made and loaded. In another embodiment, it is proposed that the system check the correctness of the video disk side loaded and thereafter proceed with the program or alternatively ask the user to supply the proper disk side.

It is an object of the invention to provide an interactive video disk side selection and verification system.

It is a further object to give the user specific instructions as to which video disk side is required and to have the user verify that the correct video disk side is loaded in the system.

It is still another object to automatically check which video side is currently in use, instruct the user if a change is required, and automatically verify that the correct side is being used.

DETAILED DESCRIPTION OF THE INVENTION

Figure 1:
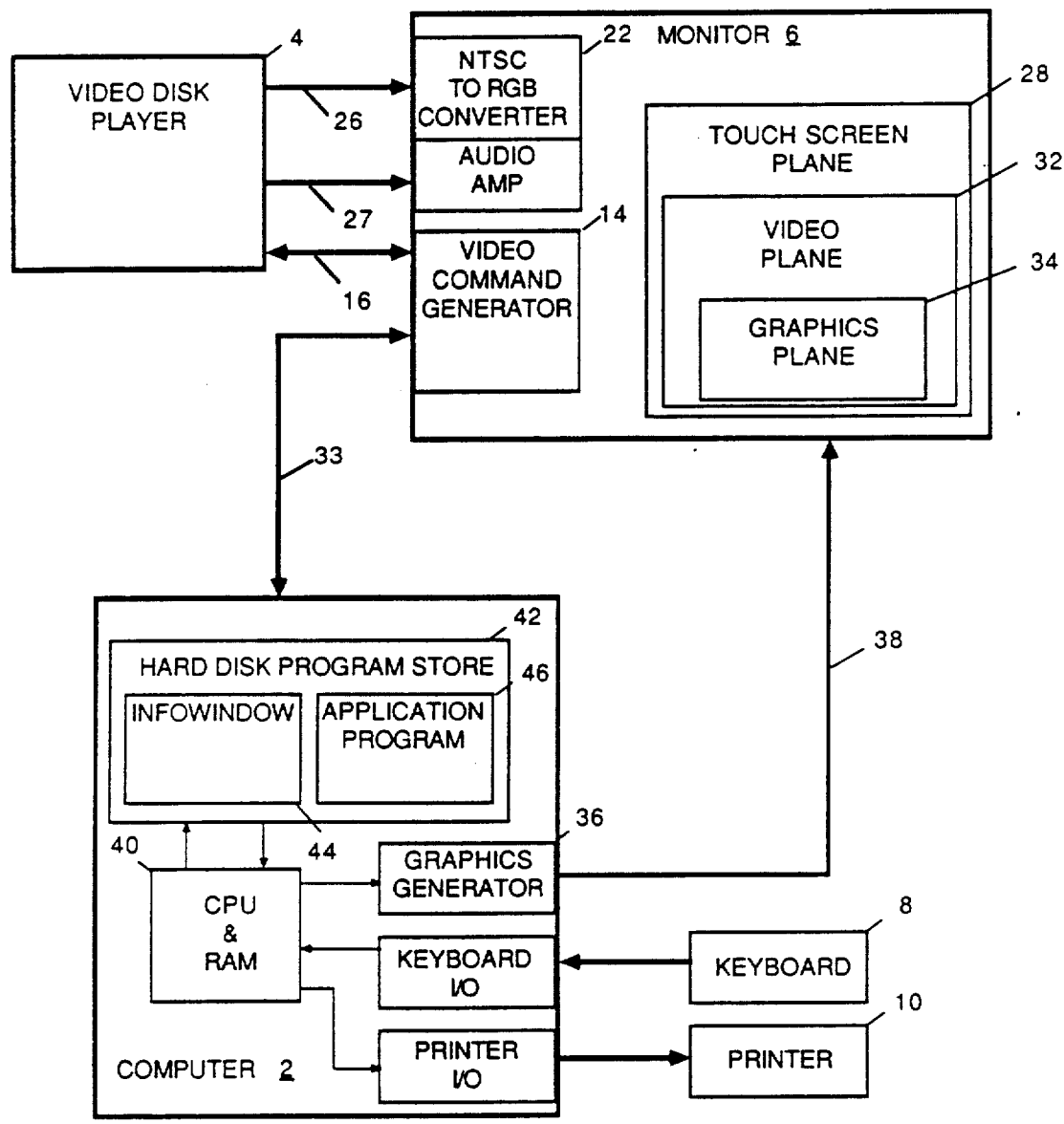
FIG. 1 is a block diagram of the hardware elements required for one embodiment of the invention.

FIG. 1 is a block diagram of the hardware elements necessary to practice the disclosed invention. A computer 2 may be implemented using an IBM AT having at least a 512 Kilobyte RAM and a 20 megabyte hard disk. Connected to the computer is a video disk player 4 such as a Pioneer Model LTV 6010A, an IBM Info-Window intelligent color monitor 6, a keyboard 8 and a printer 10. The intelligent monitor contains its own microprocessor and interface including a video command generator 14 for generating control signals to the video disk player for executing various functions which include moving the disk read head to a particular location on the video disk. Also contained within the monitor is an audio amplifier 24 and a converter 22 for converting NTSC video signals into RGB signals. The monitor 6 sends and receives control signals to and from the video disk player 4 via an R 232 C interface and cable. The monitor receives video and audio signals from the video disk player via video cable 26 and audio cable 27, respectively.

The monitor 6 also contains a touch screen which provides signals in response to and representative of the monitor screen being touched at a particular location. Diagrammatically shown within the monitor 6 is a video plane 32 which is responsive to video signals from the video disk player via the converter 22. Also shown in a graphics plane 34 which responds to a graphics generator 36 within the computer 2 via graphics cable 38. The graphics generator may typically be a commercially available IBM graphics system. The video plane and graphics plane are electrically separate within the monitor, and the signals from the converter 22 and graphics generator 36 are visually displayed as a composite screen.

Within the computer 2 is a central processing unit and RAM 40 and a hard disk which operates as program store 42. The program store stores the DOS operating system software, IBM InfoWindow software 44, and an application program 46 which is created by InfoWindow Presentation System (IWPS) also available from IBM. The computer 2 communicates with the intelligent monitor 6 via an IEEE 488 interface and cable 33.

IWPS is a C-based derivative language which is command driven and used to author an application program. The application program is then compiled and read by an interpreter within the computer 2 during execution. The output from the interpreter in essence coordinates the activities of the video disk player 4, the monitor 6, keyboard 8, printer 10 and computer 2. An application program which practices the claimed invention may be created with IWPS from the process described in FIG. 2 by one who is skilled in its use without undue experimentation.

The above described hardware can also be implemented using IBM compatible equipment. In that embodiment, the video disk player would be interfaced with the computer through an interface such as that available from Visage Corp. With such an arrangement, the converter 22 and video command generator 14 would be part of the interface contained within the computer 2. In place of the intelligent monitor, a commercially available touch screen can be attached to a standard analog color monitor. In the absence of a touch screen, user inputs can be made through the keyboard 8.

As previously described, the invention is applicable to those application programs which require more than one video disk side during execution. It is the purpose of the disclosed invention to cause the exchange of video disk sides to be interactive with the user so that such exchanges may occur correctly and quickly.

Figure 2:
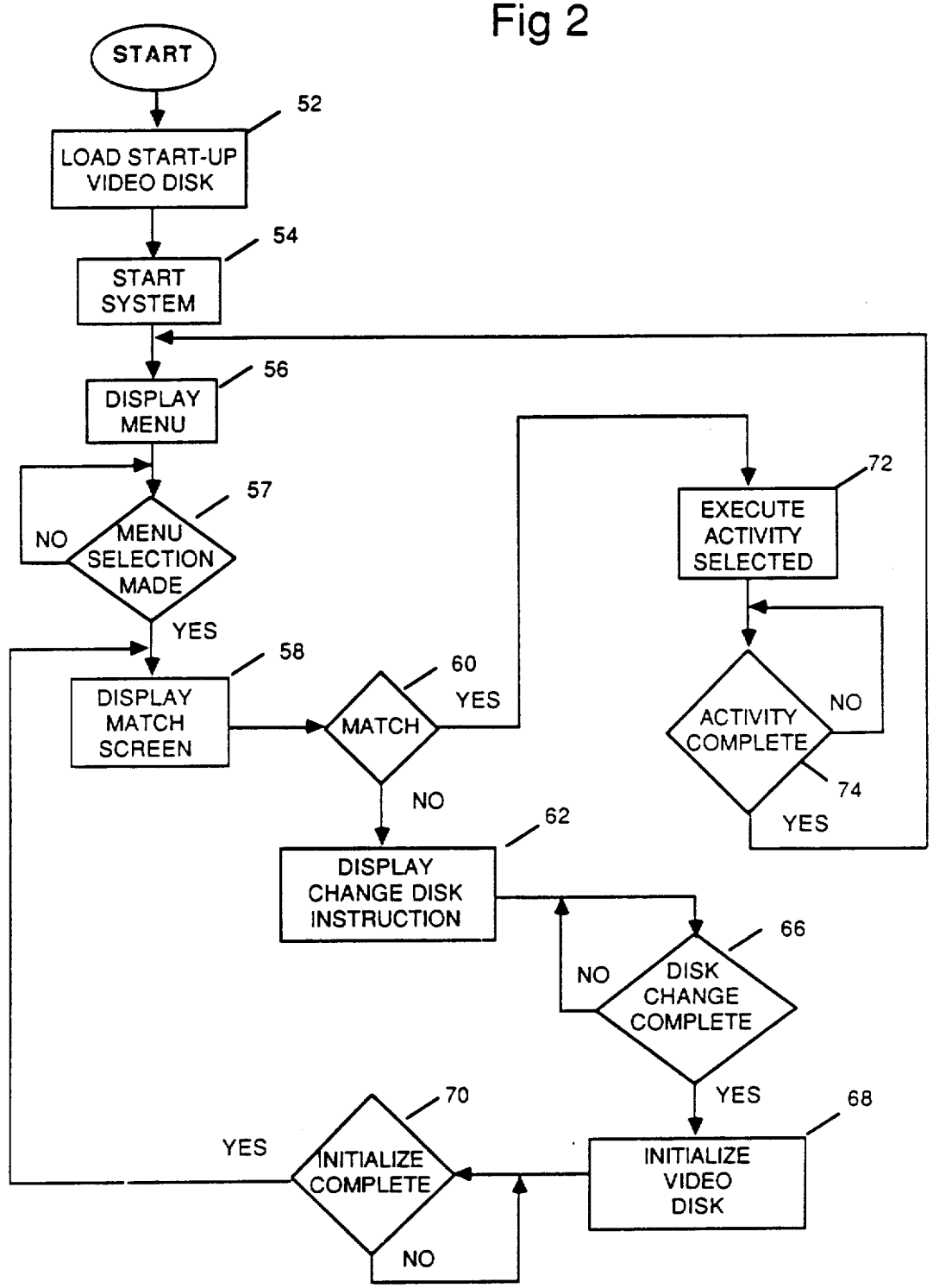
FIG. 2 is a flow chart depicting the steps required to practice one process representative of the disclosed invention.
Figure 3A:
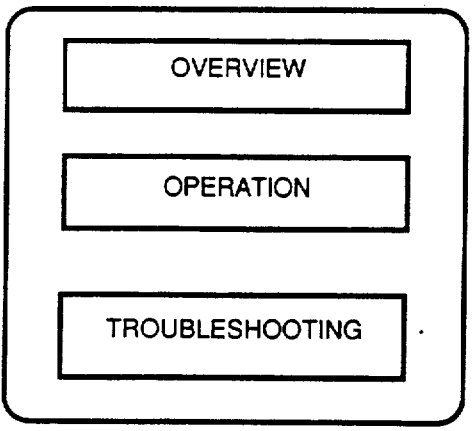
FIGS. 3a through 3d are representative displays on the touch screen monitor which occur at different steps in the process of FIG. 2.

FIG. 2 is a flow chart illustrating the steps required to execute the process. At the first step 52, the user loads a startup video disk into the video disk player. At step 54, the user applies power to the system. The system initializes itself in the standard manner and then, at step 56, displays a menu screen of selectable choices of activities or programs on the monitor 6, as shown typically in FIG. 3a. The user is then required to make a selection from the menu. In the preferred embodiment, the user would touch the monitor within the box displaying the menu selection. The detection of a menu selection per block 57 will cause an activity selection signal to be generated.

Figure 3B:
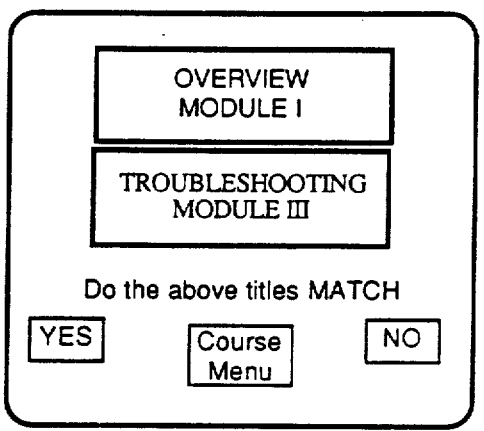

Process block 58 requires that the monitor then display a match screen such as that shown in FIG. 3b. The top or first part of the display identifies the disk side currently loaded in the disk player. That information is obtained by instructing the disk player to read a frame on the disk side which contains a label uniquely identifying the side of the disk being played. Reading of that frame produces a first, video signal which causes the disk identity or label to be displayed on the monitor. It should be remembered that the information on the video disk is video information that can be displayed on a monitor, but it cannot directly read or be interpreted by the computer.

The middle or second part of the display identifies the disk side corresponding to the activity selected. In response to the activity selection signal, the computer produces a second, graphics signal representing the identity or label of the video disk corresponding to the activity selected. The lower or third part of the display requests that the user determine whether there is a match between the video disk identities being displayed in the first and second parts of the screen. Decision block 60 in the flow chart of FIG. 2 inquires whether or not there is a match.

Figure 3C:
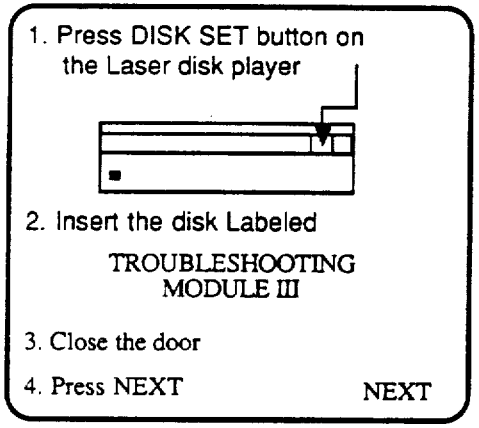

If the identities do not match, e.g. as shown in FIG. 3b, Module I vs. Module III, the user will indicate that by touching "NO" on the touch screen which will create a no match signal within the monitor and computer. In response to the no match signal, the computer will provide instructions on the video screen as represented by block 62 of FIG. 2 which instruct the user how to change a disk and the identity of the disk side to be loaded (see FIG. 3c). Upon completion of the disk change, the user touches "NEXT" on the monitor screen which produces a disk change complete signal, indicating that the disk change is complete per decision block 66 of FIG. 2. Instead of having the user indicate the completion of a disk load cycle, the same information may alternatively be obtained from the laser disk player which also generates a signal indicating that the disk change cycle is complete. In either event, process step 68 instructs the video disk player to initialize the new disk side. At the same time a screen (not shown) is displayed on the monitor advising the user that initialization is in progress. By means of the initialization process, the video disk player scans the disk to obtain data necessary to play the disk. The video disk player produces an initialization complete signal at the end of the initialization cycle at which time decision block 70 returns the process to step 58 which creates a new match screen (see FIG. 3d).

Figure 3D:
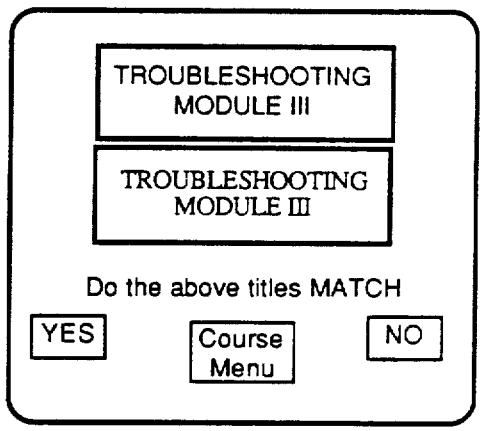

The new screen contains the disk side identity currently being played by the video disk player, the video disk side identity corresponding to the activity selection signal and a request that the user compare those disk identities. As shown in FIG. 3d, they now match; and by selecting "YES" on the touch screen, the user creates a match signal. In response to the match signal, the process per step 72 then proceeds with the execution of the selected activity or program; however, that execution will occur with the correct video disk side in the video disk player. When that activity is complete, the process via decision block 74 returns to process step 56 which again displays the activity menu.

It should be noted that it is possible for the user to load the improper disk side into the disk player. The activity or application program in such case would proceed and give instructions to the video disk to produce certain video images. Obviously, if the wrong disk side is loaded, the video images being created will not have any relevance to the activity selection that was made. It is the intent of the disclosed invention to assist the operator with disk selection and verification that the correct video disk side is in fact loaded in the video disk player.

The above embodiment requires user interaction for the matching of desired and actual disk sides. It is also possible for the system of FIG. 1 to perform the matching process. To do so, it must determine which disk side is currently loaded in the disk player. To the best of applicant's knowledge, there is no standard technique for determining the identitiy of a video disk side in a disk player. However, several alternatives are available.

First, other operating requirements may necessitate that the computer 2 contains a digital data decoder which receives a signal from the video disk player 4 and converts that signal into digital data for use in the computer. Given that decoder, a frame on the video disk may be allocated for uniquely identifying the video disk side; and that frame would produce a first data signal representing the identity or label of the video disk currently in the disk player. When the system requires a match decision as represented by decision block 60 of FIG. 2, the computer would execute a match cycle by comparing the first signal to a second signal representing the disk side identity or label corresponding to the activity selected. A match or no match signal would be generated depending on whether or not the first and second signals were the same.

Alternatively, during the initialization process some video disk players count and store the number of video disk frames on the disk side. During the production of the video disk, it is a simple matter to manufacture each disk side with a different number of video frames. Consequently, the number of frames counted by the video disk player during its initialization would be representative of a unique disk side. When a match decision is required, the computer would compare a first signal generated from the number of frames read by the disk player and representing the identity of the disk in the player with a second signal representing the disk side corresponding to the activity or program selected.

The system operates as previously described relative to FIGS. 1 and 2, except that the computer and not the user determines whether the video disk side in the player matches the activity selected. If the first and second signals are not the same, a no match signal is generated which initiates a display of disk change instructions. If the first and second signals are the same, a match signal is produced which leads to the execution of the selected activity. Therefore, the only deviation in the previously described process in FIG. 2 is that process step 58 which displays a match screen would not exist because such a match screen display is not required.

While the invention has been illustrated in some detail according to the preferred embodiment shown in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. In a system comprised of a video disk player and a video monitor interfaced with a computer, a process for interactively selecting a desired video disk in response to an activity signal representing a desired video disk to be played comprising the steps of:
    (a) executing in response to either the activity signal or a disk change complete signal, a match cycle including
        (1) generating from the video disk player a first signal representing the video disk currently in the video disk player,
        (2) generating from the computer a second signal representing the video disk corresponding to the activity signal, and
        (3) comparing the first and second signals;
    (b) generating a no match signal in response to the first and second signals representing different video disks;
    (c) displaying on the monitor in repsonse to the no match signal a screen instructing that the desired video disk be inserted in the video disk player;
    (d) generating the disk change complete signal in response to the video disk player being loaded with video disk;
    (e) generating a match signal in response to the first and second signals representing the desired video disk; and
    (f) playing the desired video disk in response to the match signal.

2. In a system comprised of a video disk player and a video monitor interfaced with a computer, a process for interactively selecting a desired video disk in response to an activity signal representing a desired video disk to be played comprising the steps of:
    (a) executing in response to either the activity signal or an initialization complete signal, a match cycle including
        (1) generating a first signal representing the video disk current in the video disk player.
        (2) generating a second signal representing the video disk corresponding to the activity signal, and
        (3) comparing the first and second signals;
    (b) generating a no match signal in response to the first and second signals representing different video disks;
    (c) displaying on the monitor in response to the no match signal a screen instructing that the desired video disk be inserted in the video disk player;
    (d) generating a disk change complete signal in response to the video disk player being loaded with a video disk;
    (e) initializing the video disk in the video disk player;
    (f) generating an initialization complete signal in response to the video disk being initialized;
    (g) generating a match signal in response to the first and second signals representing the desired video disk; and
    (h) playing the desired video disk in response to the match signal.

3. In a system comprised of a video disk player and a video monitor interfaced with a computer, a process for interactively selecting a desired video disk in response to an activity signal representing a desired video disk to be played comprising the steps of:
    (a) displaying on the monitor in response to either the activity signal or a disk change complete signal, a match screen including
        (1) a first part identifying a video disk currently in the video disk player,
        (2) a second part identifying the desired video disk, and
        (3) a third part requiring a selection of whether or not the first and second parts of the match screen match;
    (b) generating a no match signal in response to a no match selection from the match screen;
    (c) displaying on the monitor in response to the no match signal a screen instructing that the desired video disk be loaded in the video disk player;
    (d) generating a disk change complete signal in response to the video disk player being loaded with a video disk; and
    (e) generating a match signal in response to a match selection from the match screen.

4. In a system comprised of a video disk player and a video monitor interfaced with a computer, a process for interactively selecting a desired video disk in response to an activity signal representing a desired video disk to be played comprising the steps of:
    (a) displaying on the monitor in response to either the activity signal or an initialization complete signal, a match screen including
        (1) a first part identifying a video disk currently in the video disk player,
        (2) a second part identifying the desired video disk, and
        (3) a third part requiring a selection of whether or not the first and second parts of the match screen match;
    (b) generating a no match signal in response to a no match selection from the match screen;
    (c) displaying on the monitor in response to the no match signal a screen instructing that the desired video disk be loaded in the video disk player;
    (d) generating a disk change complete signal in response to the video disk player being loaded with a video disk;
    (e) initializing the video disk in the video disk player;
    (f) generating an initialization complete signal in response to the video disk being initialized;

(g) generating a match signal in response to the first and second signals representing the desired video disks; and (h) playing the desired video disk in response to the match signal.

5. In a system comprised of a video disk player, a monitor and an I/O device interfaced with a computer, a process for interactivity selecting a desired video disk side during the execution of a program comprising the steps of:

(a) displaying on the monitor a menu of choices of activities any one of which may be selected;

(b) generating an activity selection signal in response to an activity selection made;

(c) displaying in response to the activity selection signal or an initialization signal, a match screen including (1) a first part identifying a video disk side currently in the video disk player, (2) a second part identifying a video disk side corresponding to the activity selection signal, and (3) a third part requiring a selection of whether or not the first and second parts of the match screen match;

(c) generating a no match signal in response to a no match selection from the match screen;

(d) displaying on the monitor in response to the no match signal a screen identifying the video disk side to be loaded in the video disk player;

(e) generating a disk change complete signal in response to the video disk player being loaded with a video disk;

(f) initializing the video disk side in the video disk player;

(g) generating an initialization complete signal in response to the video disk side being initialized;

(h) generating a match signal in response to a match selection from the match screen; and (i) playing the desired video disk associated with the activity selection signal in response to the match signal.

* * * * *